(12) United States Patent
Beitman

(10) Patent No.: US 7,841,786 B2
(45) Date of Patent: Nov. 30, 2010

(54) DIGITAL CAMERA SENSOR CLEANING AND LENSE CHANGING CASE

(76) Inventor: Richard Clark Howell Beitman, 1318 N. Sailors Way, Gilbert, AZ (US) 85234

(*) Notice: Subject to any disclaimer, the term of this patent is extended or adjusted under 35 U.S.C. 154(b) by 199 days.

(21) Appl. No.: 12/082,611

(22) Filed: Apr. 14, 2008

(65) Prior Publication Data

US 2009/0255845 A1 Oct. 15, 2009

(51) Int. Cl.
*G03D 17/00* (2006.01)
*B65D 85/38* (2006.01)

(52) U.S. Cl. .................... 396/590; 206/316.2; 206/578; 206/720; 396/591

(58) Field of Classification Search .............. 206/316.1, 206/316.2, 484.2, 578, 720; D3/267; 396/590–592, 396/25, 27; 352/242; 355/21; 359/511
See application file for complete search history.

(56) References Cited

U.S. PATENT DOCUMENTS

| | | | | | |
|---|---|---|---|---|---|
| 428,036 | A | * | 5/1890 | Bausch | 396/591 |
| 769,030 | A | * | 8/1904 | Stewart | 396/591 |
| 929,807 | A | * | 8/1909 | Willyerd | 396/590 |
| 1,117,035 | A | * | 11/1914 | Green | 396/592 |
| 2,158,575 | A | * | 5/1939 | Foster et al. | 396/590 |
| 2,487,506 | A | * | 11/1949 | Zaleski | 396/591 |
| 4,176,701 | A | * | 12/1979 | Welgan | 206/316.2 |
| 4,529,296 | A | * | 7/1985 | Taylor et al. | 206/316.1 |
| 4,984,662 | A | * | 1/1991 | Jacober | 206/316.2 |
| 5,201,867 | A | * | 4/1993 | Morszeck | 206/316.2 |
| 5,337,891 | A | * | 8/1994 | Toth | 206/316.2 |
| 5,996,790 | A | * | 12/1999 | Yamada et al. | 206/316.1 |
| 7,613,386 | B2 | * | 11/2009 | Shimamura | 206/316.2 |
| 2004/0251151 | A1 | * | 12/2004 | Doran, Jr. | 206/316.1 |
| 2006/0096874 | A1 | * | 5/2006 | Doran, Jr. | 206/316.2 |

* cited by examiner

*Primary Examiner*—Luan K Bui
(74) *Attorney, Agent, or Firm*—Adam R. Stephenson, Ltd

(57) ABSTRACT

Disclosed is a collapsible field deployable environmental enclosure device with internal electronic air scrubbing and static suppression electronics, high luminosity wide angle solid state lighting, magnifying optics, viewing ports, an expansion compartment, utility compartments, and sealed operator arm ports. This device was developed for the purpose of containing a Digital SLR (Single Lense Reflex) camera, a digital rangefinder camera, a digital medium format camera, or medium and large format digital camera backs. The stated equipment is contained within the invention as a prophylactic method of avoiding dust and particle contamination to the sensor and body cavity while in the process of exposing the internal body cavity and or the digital image sensor during the operations of either changing lenses, cleaning the image sensor, or other inspection and maintenance procedures. This invention may also be used for other particle sensitive equipment. The enclosure was also developed to facilitate photographing in rain conditions.

14 Claims, 3 Drawing Sheets

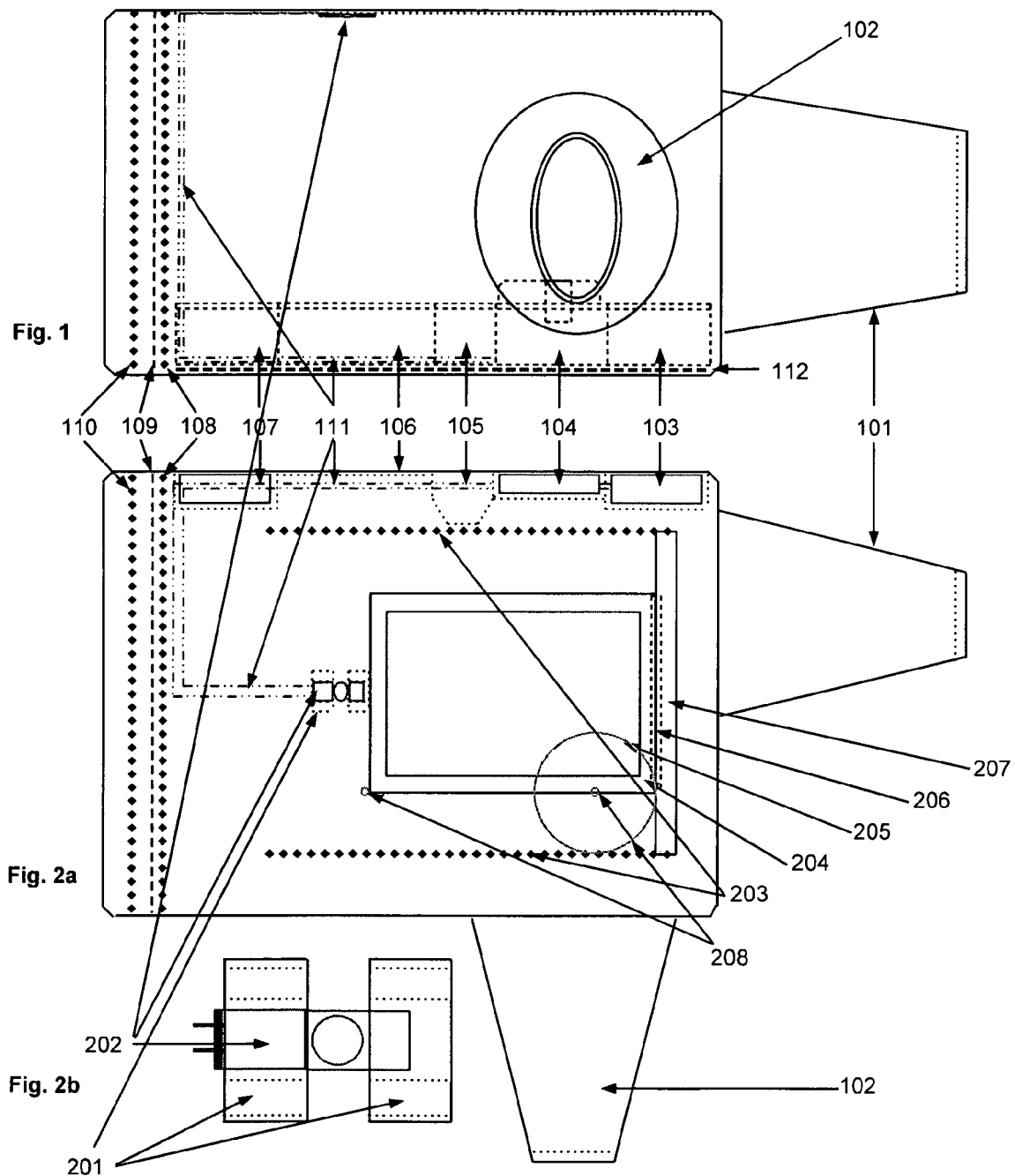

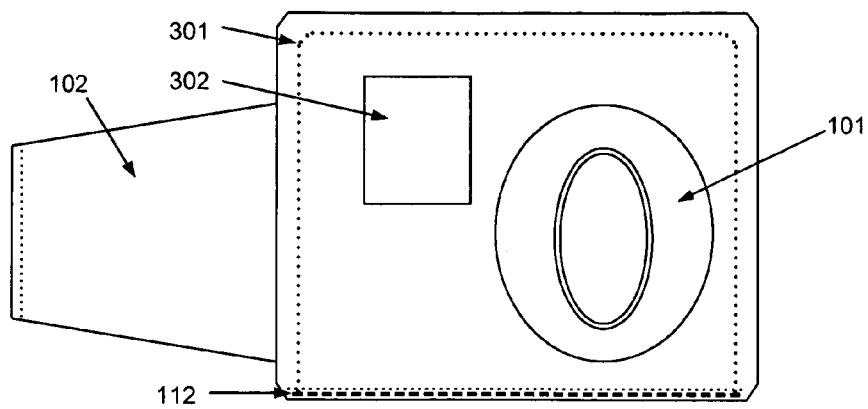
Fig. 3
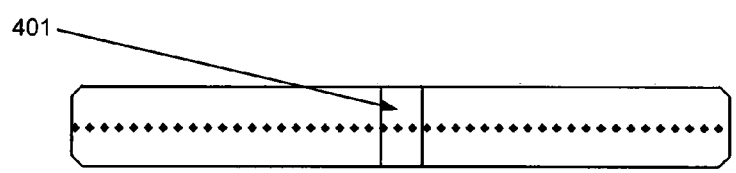
Fig. 4
Fig. 5a
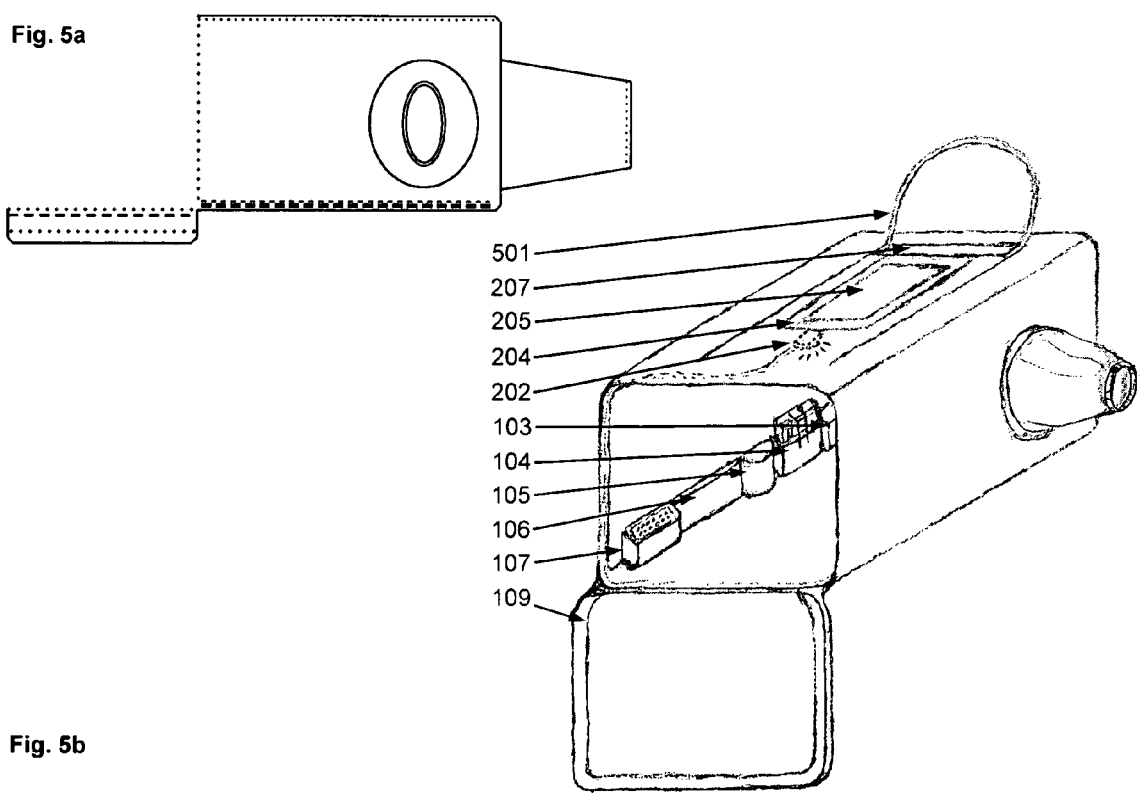
Fig. 5b

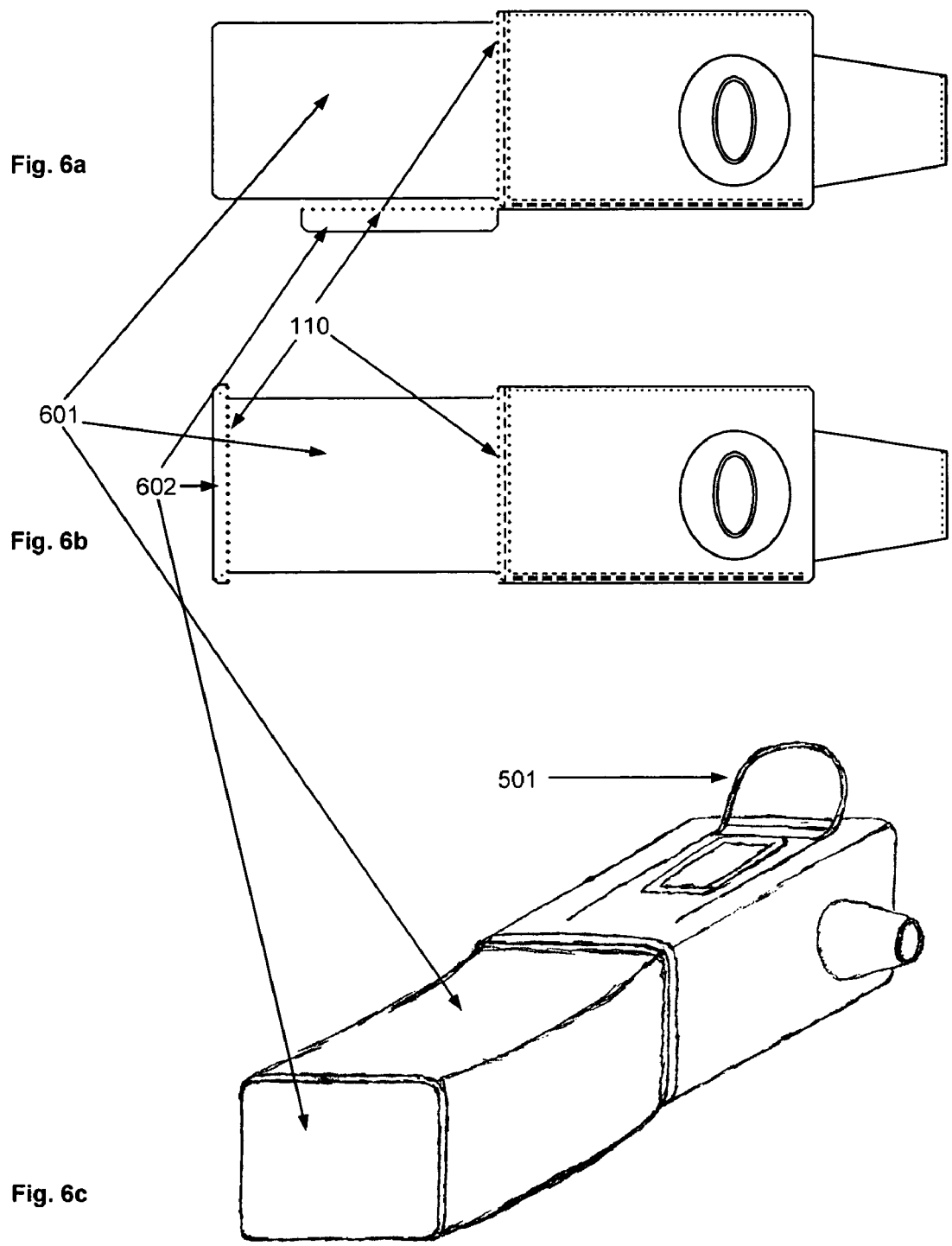

DIGITAL CAMERA SENSOR CLEANING AND LENSE CHANGING CASE

BACKGROUND OF THE INVENTION

With the advent of the digital SLR (Single Lens Reflex) camera, digital rangefinder camera, digital medium format camera, and medium and large format digital camera backs replacing their film counterparts, a new set of problems have arisen. The ultra high resolution digital image sensors that have replaced analog film are composed of millions to tens of millions of individual pixel sensors that comprise the overall picture image. These pixels vary in pitch based on the overall sensor density from approximately 3 to 9 microns in pitch. The size and pitch of these pixels makes the image sensor very susceptible to microscopic dust particles that impair the digital images with artifacts. The susceptibility of the sensor to dust particles transpires whenever a lens is removed from the camera body exposing the sensor cavity to ambient air. The sensor becoming contaminated with particles can also become exacerbated when particles that have entered the sensor cavity are drawn to the sensor by electrostatic charge. This event has the propensity of materializing every time the sensor becomes energized. The function of removing a lens becomes necessary for various reasons. The most common being when the photographer changes lenses in order to optimize a photographic composition, cleaning the image sensor from existing dust and microscopic debris, or other internal functions such as inspection or maintenance. The most prophylactic method of avoiding sensor contamination was to create a field deployable convenient enclosed environment that can block wind currents carrying particles and Venturi effects, subdue electrostatic charge, and scrub the air of existing particles, enabling the exposure of the sensor cavity during the normal operation of the camera substantially less vulnerable to particulate contamination.

BRIEF SUMMARY OF THE INVENTION

It is an object of the present invention to provide a method and mobile environmental chamber for the operator of a digital SLR camera, digital rangefinder camera, digital medium format camera, and medium and large format digital camera backs to change lenses and/or expose the internal cavity of the camera or sensor area whereby creating a very low particle environment as a prophylaxis to particle contamination of the sensor that would impair images or require more frequent cleaning of the sensor as is currently the standard mode of operation. During photographic operations, a camera with a lens, and an additional lens to be changed to can be secured inside the case via a dual-zippered quick entrance upper panel. Turning on the power pack energizes both a tuned complimentary Ion generator that scrubs the air of microscopic particles and suppresses static charge, and energizes a high luminosity wide beam solid state overhead light. Inserting hands and forearms through two tapered arm sleeves with elastic seals enables the operator to change the lenses without introducing new particulates. The primary case compartment was designed to accommodate changing lenses in the most common focal lengths up to 400 mm. An extension compartment concealed in the end panel can be deployed to support optics up to 800 mm.

It is an object of the present invention to provide a method and chambered environment for the operator of a digital SLR camera, digital rangefinder camera, digital medium format camera, and medium and large format digital back to clean a contaminated sensor in a low particle environment to reduce the risk of particle contamination while the sensor is exposed as is currently the standard mode of operation. In the sensor cleaning operation, the same advantages as stated above apply. Additionally two other objects of the design are an interchangeable overhead Fresnel magnifier designed into the upper windowed panel and a high luminosity overhead light. These objects allow greater visibility for fine work, inspection, and low light operation. The side panels of the case have elastic utility pouches installed for storing and accessing sensor cleaning materials creating an efficient, uncluttered working environment while doing a sensor cleaning mirror up operation.

It is an object of the present invention to provide a method of photographing in the rain. The primary chamber is comprised of two layers of water resistant material. The end panel zips down creating a recessed aperture for the camera, minimizing the risk of water damage to the equipment and minimizing water obscuring the optics. A clear vinyl window is designed into the control end of the chamber enabling the operator to compose images in either portrait or landscape mode either through the viewfinder or LCD preview screen. This design also gives the operator freedom of not being tethered to a tripod.

It is another object of the present invention to provide the stated operation capability above in an environmental chamber that when not in use can be collapsed down to the size of a laptop computer to conveniently store away or travel in the laptop computer compartment installed in many of the newly developed camera bags for today's digital photographic market.

It should be noted that the above summary is not intended to limit the scope of the invention or alternate applications or industries that may benefit from the usefulness provided by this invention.

BRIEF DESCRIPTION OF THE SEVERAL VIEWS OF THE DRAWINGS

A more complete understanding can be obtained by reference to the following drawings and description, wherein:

FIG. 1 is a side view schematic drawing of the left hand operator side depicting the primary chamber, arm ports, end compartment panels and zippers, internal wires and internal electronic and utility pouches wherein;

FIG. 2a is a top view schematic showing an alternate view of FIG. 1 descriptions and additionally portraying the upper windowed and lensed equipment port and overhead lighting assembly wherein;

FIG. 2b is an enlarged view of the connectorized lighting assembly;

FIG. 3 is an end view schematic drawing of the right hand operator side and also depicting the window location for photographing in the rain wherein;

FIG. 4 is a side view drawing of the case collapsed into a folded laptop computer configuration;

FIG. 5a is a side view drawing with the end cap compartment pulled down as would be utilized for photographing in the rain or end access to the main chamber wherein:

FIG. 5b is a perspective drawing of the main chamber also with the end cap compartment pulled down giving a perspective of the internal electronic and utility pouches. The ganged zipper quick entrance strap is also visible from this perspective wherein:

FIG. 6a is a side view drawing of the end cap compartment opened and the extension compartment deployed. Note: The internal compartment panel would also be opened at this time to access the main chamber wherein;

FIG. 6b is a side view drawing also of the end cap compartment being opened only in this design configuration option the end cap is part of the extension compartment wherein;

FIG. 6c is a perspective drawing of FIG. 6b

DETAILED DESCRIPTION OF THE INVENTION

While the present invention will hereinafter be described in connection with various embodiments thereof, it will be understood that it is not intended to limit the invention to these embodiments. On the contrary, it is intended to cover all alternatives, modifications and equivalents that may be included within the spirit and scope of the invention as defined by the appended claims.

For a general understanding of the features of the present invention, reference is made to the drawings, like reference numerals have been used throughout to designate identical elements. FIG. 1 and FIG. 2a schematically depict the side and top view of the main chamber of the invention erect. The main chamber is comprised of two layers of water resistant fabric. The outer layer is of a heavier gauge then the inner lining. Various supple materials will be used comparable to a Poly Denier. The primary functions of the main chamber wall material are to create a wind block eliminating wind currents and Venturi effects carrying dust particles, acting as a micron level particle filter, and a soft inner lining to avoid abrasion of precision optical equipment. The base 112 (Standard configuration) is a stiff base plate wrapped in soft batting material and sleeved between the two base wall layers. It is in this erect configuration that sensor cleaning and inspection of digital SLR cameras, digital rangefinder cameras, digital medium format cameras, or medium and large format digital backs and the operation of changing lenses up to 400 mm on the camera body is done. Changing longer focal length lenses will be covered later. The main chamber can be accessed through either the rear access port 108 comprised of a shrouded three sided zipper that enables the panel to be lowered for alternate use covered later or access can be made through the upper panel through the double seamed Velcro sealed port 207. By opening the Velcro seam and pulling back on the ganged zipper strap FIG. 5b 501 the heavy gauge shrouded zippers 203 will open accessing the main chamber. The chamber should be resealed for normal operation. The operator's hands and forearms can access the main chamber for functional operations through the tapered elastically sealed arm ports 101 (right hand) and 102 (left hand).

The power pack 104 housed in its own Velcro strapped elastic lined pouch should be turned on for normal operation. Turning the power pack switch on will energize the silent running complimentary tuned Ion generators 103 and 107 both housed in an elastic lined pouch and energize the overhead lamp assembly 202. Upon actuation the Ion transducers begin to clear the main chamber of all micro particles and also suppress static charge. The main chamber is cleared of particles that normally aren't visible to the naked eye in a matter of moments. (It should be noted that extensive testing was done in a test chamber approximately 1½ times the volume of the main invention chamber. The test chamber was saturated with various heavy smokes and incenses. The Ion transducers of the same configurations being used in the invention were then turned on and laser sensors scanned the chamber for Raman scattering (Spectroscopy). The test chamber was void of discernable particle material in approximately 3½ minutes. Although this test is of a magnitude millions of times greater than that which would be experienced in the invention under normal use, it demonstrates the efficacy of the invention.) As mentioned earlier, the overhead lamp 202 is simultaneously energized with the Ion transducers 103 and 107. The overhead lamp assembly 202 expanded in FIG. 2b is a connectorized high luminosity wide angle white LED (Light Emitting Diode) on a TO-220 heat dissipating metal base. The LED assembly configurations will normally emit 29 to 38 lm (Steradian measurement) at a 120 degree beam angle at typical forward current but will be current limited to 10.5 to 13 lm respectively as the standard configuration. The 120 degree beam angle will illuminate the entire chamber base. The connectorized lamp assembly 202 is secured to the upper chamber wall by sewn elastic mounts 201. The combination of the current limiting connector assembly and the mount configuration will enable the operator to reconfigure the luminosity conveniently to higher or lower level options. The LED overhead lamp 202 serves three primary functions: 1. A visual aid in the sensor cleaning operation; 2. A visual aid in low light photography; and 3. A second visual on/off power switch indicator.

The upper panel has a double layered 30 gauge clear vinyl window 204 as a visual aid to chamber operations. Sleeved between the two clear vinyl layers is a Planar Fresnel Magnifier 205 optimized to the focal length of the standard 35 mm SLR sensor height when resting on the base during the sensor cleaning operation. An optional focal length magnifier is available for sensor cleaning operations on medium format sensor backs or any other operation that requires a closer focal length. The magnifier 205 can be conveniently removed and/or replaced from the double clear vinyl window 204 through the Velcro end seal 206. During the sensor cleaning operation, many liquid and dry cleaning agents are utilized. Elastic lined utility pouch 106 was optimized for accessing and storing the most common solid cleaning agents and swabs whereby elastic lined utility pouch 105 was optimized for storing the most common fluid applicator bottles.

Anode and Cathode wires 111 serpentine between the double layer walls of the chamber from the lamp assembly 202, transducers 103 and 107 to the power pack 104. Polarized, insulated, non-shorting interconnects terminate the electronic assembly between all electronic devices described enabling convenient battery change or component replacement.

During the lens changing operation when it becomes necessary to change to and from lenses greater then a 400 mm focal length, the extension chamber FIGS. 6, 601 is deployed. The extension chamber is folded and concealed between the end cap 602 and the extension chamber partition FIGS. 1 & 2, 109 when not in use. The extension chamber is released by either the option of a three sided zipper FIG. 6a, 110 bending the end cap down or the option of a four sided zipper FIG. 6b, 110 whereby the end cap becomes a part of the extension chamber. When the extension chamber is deployed, access between the two chambers is made through the partition panel 109 zipper or Velcro option seal FIG. 3, 301.

When the invention is used for photographing in the rain, the three sided shrouded zipper 108 is opened bending the panel down and exposing the primary chamber. With the primary chamber maintained in a horizontal position, it becomes a rain cover for the camera body and recessed optics. Clear vinyl window FIG. 3, 302 enables the operator to compose the camera either through the image finder or through the camera LCD preview feature. The case enables the operator to compose the camera in either landscape or portrait mode freely without a tripod. An optional threaded metal base plate attachment FIG. 2a, 208 feeds through the rigid base of the case at various location holes allowing a camera to become rigidly mounted to a tripod.

When the invention isn't being operated, the arm ports can invert into the main chamber, the side and end walls fold inward, and the case collapses down to the size of a conventional laptop computer FIG. 4. The Velcro straps 401 maintain the case in the collapsed mode to conveniently store away or travel in the laptop computer compartment installed in many of the newly developed camera bags for today's digital photographic market.

What is claimed is:

1. A collapsible field deployable double layered water resistant fabric case, the fabric case comprising a rectangular box shaped chamber comprising a rectangular base plate, two base walls extending upwardly from two opposing sides of the base plate, an upper panel extending between the two base walls in opposition to the base plate, a rear access port and an arm port in opposition to the rear access port, both the rear access port and the and the arm port extending upwardly from two other opposing sides of the base plate and connecting to the base plates and the upper panel, the base plate, the side walls, the upper panel, the rear access port and the arm port defining the chamber, the base plate, the side walls, the upper panel, the rear access port and the arm port all being foldably connected and having an erect position capable of encapsulating and protecting a digital camera and one or more lenses and a folded position for storage and transportation, and a balanced complimentary polarized ion generator and associated circuitry for the purpose of clearing the chamber of micro dust particles.

2. The collapsible field deployable double layered water resistant fabric case as recited in claim 1 wherein the ion generator and associated circuitry suppresses static electricity in the chamber.

3. The collapsible field deployable double layered water resistant fabric case as recited in claim 1 further includes an overhead two layered clear vinyl viewing port mounted in the upper panel.

4. The collapsible field deployable double layered water resistant fabric case as recited in claim 3 wherein the overhead two layered clear vinyl viewing port includes an interchangeable and removable acrylic planar Fresnel magnifying lens optimized to configured focal lengths sleeved within the overhead two layered clear vinyl viewing port.

5. The collapsible field deployable double layered water resistant fabric case as recited in claim 1 further including an overhead high luminosity interchangeable wide viewing angle LED lamp assembly with discrete interconnect.

6. The collapsible field deployable double layered water resistant fabric case as recited in claim 5 wherein the lamp assembly further includes an interchangeable and reconfigurable current limiting resistor.

7. The collapsible field deployable double layered water resistant fabric case as recited in claim 1 further including two elastic sealed tapered access arm ports.

8. The collapsible field deployable double layered water resistant fabric case as recited in claim 1 further including a concealed extension chamber extending the overall length of the main chamber for the purpose of accommodating telephoto lenses greater then 400 mm in focal length and greater than 800 mm with the inclusion of lens convertors.

9. The collapsible field deployable double layered water resistant fabric case as recited in claim 1 further including a clear vinyl viewing window positioned in one of the base walls for composing images through either the viewfinder or LCD preview feature of the digital camera when utilizing the case as a protective cover when photographing in the rain.

10. The collapsible field deployable double layered water resistant fabric case as recited in claim 1 further including a zippered panel opening at the arm port .

11. The collapsible field deployable double layered water resistant fabric case as recited in claim 1 further including one or more elastic and Velcro sealed utility pouches positioned on the side walls for the purpose of housing electronic subassemblies and cleaning accessories for easy access.

12. The collapsible field deployable double layered water resistant fabric case as recited in claim 1 further including a threaded metal positioned in the base plate to bolt the underside of the base plate to a camera tripod thread and the upper side of the base plate to a camera.

13. The collapsible field deployable double layered water resistant fabric case as recited in claim 1 further including a DC plug interconnect system between all electronic subassemblies enabling convenient change out of batteries, lamp and transducer assemblies for alternate configurations, maintenance, and upgrades.

14. A collapsible field deployable double layered water resistant fabric case, the fabric case comprising a rectangular box shaped chamber comprising a rectangular base plate, two base walls extending upwardly from two opposing sides of the base plate, an upper panel extending between the two base walls in opposition to the base plate, a rear access port and an arm port in opposition to the rear access port, both the rear access port and the arm port extending upwardly from two other opposing sides of the base plate and connecting to the base plates and the upper panel, the base plate, the side walls, the upper panel, the rear access port and the arm port defining the chamber, the base plate, the side walls, the upper panel, the rear access port and the arm port all being foldably connected and having an erect position capable of encapsulating and protecting a digital camera and one or more lenses and a folded position for storage and transportation, a balanced complimentary polarized Ion generator and associated circuitry for the purpose of clearing the chamber of micro dust particles by suppressing static electricity in the chamber, an overhead two layered clear vinyl viewing port mounted in the upper panel, the overhead two layered clear vinyl viewing port including an interchangeable and removable acrylic planar Fresnel magnifying lens optimized to configured focal lengths sleeved within the overhead two layered clear vinyl viewing port, an overhead high luminosity interchangeable wide viewing angle LED lamp assembly with discrete interconnect, the lamp assembly further including an interchangeable and reconfigurable current limiting resistor, two elastic sealed tapered access arm ports, positioned in the rear access port and a base wall, a concealed extension chamber extending the overall length of the main chamber for the purpose of accommodating telephoto lenses, a clear plastic viewing window positioned in one of the base walls for composing images through either the viewfinder or LCD preview feature of the digital camera when utilizing the case as a protective cover when photographing in the rain, a zippered panel opening at the arm port , one or more elastic and Velcro sealed utility pouches positioned on the side walls for the purpose of housing electronic subassemblies and cleaning accessories for easy access, a threaded metal feed-through positioned in the base plate to bolt the underside of the base plate to a camera tripod thread and the upper side of the base plate to a camera, and a DC plug interconnect system between all electronic subassemblies enabling convenient change out of batteries, lamp and transducer assemblies for alternate configurations, maintenance, and upgrades.

* * * * *